United States Patent
Liu et al.

(10) Patent No.: US 10,779,352 B2
(45) Date of Patent: Sep. 15, 2020

(54) MULTI-GATEWAY COMMUNICATION METHOD AND WIRELESS GATEWAY SYSTEM THEREOF

(71) Applicant: KIWI TECHNOLOGY INC., Hsinchu County (TW)

(72) Inventors: Jian-Hong Liu, Hsinchu County (TW); Chun-Yu Wang, Hsinchu County (TW); Tsung-Chih Huang, Hsinchu County (TW)

(73) Assignee: KIWI TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 16/180,475

(22) Filed: Nov. 5, 2018

(65) Prior Publication Data
US 2019/0335525 A1 Oct. 31, 2019

(30) Foreign Application Priority Data
Apr. 30, 2018 (TW) .............................. 107114692 A

(51) Int. Cl.
*H04W 76/20* (2018.01)
*H04W 40/02* (2009.01)
(Continued)

(52) U.S. Cl.
CPC ............. *H04W 76/20* (2018.02); *H04L 45/48* (2013.01); *H04W 40/02* (2013.01); *H04W 40/24* (2013.01); *H04W 84/18* (2013.01); *H04W 88/16* (2013.01)

(58) Field of Classification Search
CPC ....................... H04W 84/16–22; H04W 92/20
See application file for complete search history.

(56) References Cited

U.S. PATENT DOCUMENTS

| | | | | |
|---|---|---|---|---|
| 2008/0089277 | A1* | 4/2008 | Alexander | .......... H04L 12/2816 370/328 |
| 2009/0190522 | A1* | 7/2009 | Horn | .................... H04W 40/248 370/315 |

(Continued)

FOREIGN PATENT DOCUMENTS

| | | |
|---|---|---|
| CN | 107071791 A | 8/2017 |
| CN | 107911801 A | 4/2018 |

(Continued)

*Primary Examiner* — Marcus Smith
(74) *Attorney, Agent, or Firm* — Li & Cai Intellectual Property (USA) Office

(57) ABSTRACT

The disclosure is related to a multi-gateway communication method. The method is applied to a wireless gateway system that includes multiple nodes including a number of gateways. A root gateway is provided among the gateways. When a gateway receives an uplink data from a node, the uplink data is transmitted to a backend server if the gateway is the root gateway. The uplink data is transmitted to a parent gateway if the gateway is not the root gateway. On the other hand, when the gateway receives downlink data from a node, it is determined if a destination node is recorded in a downlink routing table of a descendant gateway if gateway is not connected with the destination node but with the descendant gateway. If the destination node is recorded in the downlink routing table, the data is transmitted to the descendant gateway; otherwise, the downlink data is discarded.

12 Claims, 6 Drawing Sheets

(51) Int. Cl.
    *H04L 12/753*    (2013.01)
    *H04W 88/16*    (2009.01)
    *H04W 84/18*    (2009.01)
    *H04W 40/24*    (2009.01)

(56) References Cited

U.S. PATENT DOCUMENTS

| | | | |
|---|---|---|---|
| 2015/0156070 A1* | 6/2015 | Gidlund | H04L 45/26 370/254 |
| 2016/0029384 A1* | 1/2016 | Sidhu | H04W 72/0453 370/329 |
| 2017/0079040 A1* | 3/2017 | Shanmugam | H04W 40/22 |
| 2018/0018823 A1 | 1/2018 | Cianciolo et al. | |
| 2018/0062873 A1 | 3/2018 | Chiang et al. | |
| 2018/0183875 A1* | 6/2018 | Liu | H04W 4/70 |
| 2018/0248983 A1* | 8/2018 | Mohebbi | H04W 4/70 |

FOREIGN PATENT DOCUMENTS

| | | |
|---|---|---|
| JP | 2009200768 A | 9/2009 |
| JP | 201393717 A | 5/2013 |
| JP | 201717670 A | 1/2017 |
| TW | 201807981 A | 3/2018 |

\* cited by examiner

MULTI-GATEWAY COMMUNICATION METHOD AND WIRELESS GATEWAY SYSTEM THEREOF

CROSS-REFERENCE TO RELATED PATENT APPLICATION

This application claims the benefit of priority to Taiwan Patent Application No. 107114692, filed on Apr. 30, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a communication method and system, and in particular to a communication method implementing uplink and downlink data transmission in a network system with multiple gateways, and a wireless gateway system thereof.

BACKGROUND OF THE DISCLOSURE

A conventional wireless communication technology performs data transmission through a gateway, and in particular between two network domains. The conventional circuit design of the wireless gateway is to dispose a gateway circuit for processing packets received from the terminals, a controller for operating the gateway and a transceiver for delivering data into a wireless gateway. It is possible to dispose multiple wireless gateways in a network system so as to process more data generated by the terminals.

Referring to FIG. 1, in a specific wireless network system, a framework of the system shows a plurality of wireless gateways 101, 102 and 103 that can be a type of long range (LoRa) concentrator. This type of long-distance and low-power-consumption communication technology is applicable to IoT (Internet of Things). The LoRa concentrator is capable of bi-directional communication for linking with terminals A, B, C, D and E. The terminals A, B, C, D and E can be various sensors and electronic devices of IoT. The wireless gateways 101, 102 and 103 process the data transmitted by the terminals A, B, C, D and E. The terminals A, B, C, D and E can be respectively connected with the same or different wireless gateways 101, 102 and 103 by a specific communication protocol such as WiFi™, Bluetooth™, or Zigbee. The wireless gateways 101, 102 and 103 can transmit the data to backend application devices 111, 112 and 113 via a network server 110.

For example, the terminals A, B, C, D and E are such as environmental sensors disposed in a plant. The sensors can be a smoke detector, a thermometer, a hygrometer, a light sensor, a power sensor, a video monitor, and/or various electronic nodes. For receiving the signals generated by the terminals A, B, C, D and E, some wireless gateways 101, 102 and 103 may be required at certain places. A network server 110 is also provided for collecting the data from the gateways 101, 102 and 103 and then providing for the backend applications. The backend application devices 111, 112 and 113 may form an IoT ecosystem that provides functionalities such as power monitoring, plant temperature and humidity monitoring, personnel movement monitoring, and equipment monitoring.

The gateway device is necessary for the conventional IoT communication system to establish linkage and communication because the communication capabilities of nodes of the system are limited. However, the system still needs to have a reliable and expandable communication scheme between the nodes and the gateway device.

SUMMARY OF THE DISCLOSURE

The disclosure is related to a multi-gateway communication method and a wireless gateway system. The wireless gateway system includes a plurality of nodes. The wireless gateway system is such as an IoT system that includes the nodes. A gateway device that is used as a communication gateway and terminals are included in the system. The multi-gateway communication method is provided for the system to regulate uplink and downlink transmission among the nodes. The framework of the wireless gateway system provides a root gateway that is used to connect with an external network. The external network exemplarily has a backend server that is used to store node information and data. The gateway device allows the nodes to communicate with each other.

According to one of the embodiments of the disclosure, the wireless gateway system includes the backend server and the plurality of nodes. In addition to terminals, the nodes further include the plurality of gateway devices that are used to communicate with the terminals. A root gateway is set among the gateway devices and used to connect with the backend server via the external network.

Each of the gateway devices runs a software server. The gateway device includes a downlink routing table. The software server is used to perform the multi-gateway communication method. In the method, if one of the gateway devices receives uplink data from one of the nodes, the software server of the gateway device that receives the data determines whether or not the node transmitting the data is a descendant gateway device. If the node is not a descendant gateway device, the software server determines whether or not the gateway device receiving the data is a root gateway of the whole system. If the gateway device acts as the root gateway, the uplink data is transmitted to the backend server via the root gateway. Otherwise, if the gateway device is not the root gateway but a normal gateway device, the uplink data is transmitted to a parent gateway device.

Further, if the node is the descendant gateway device, a routing path is set to the descendant gateway device; after the routing path is set to the descendant gateway device, the method goes on to determine whether or not the gateway device is the root gateway.

It is worth noting that each of the gateway devices has an ID and an address when joining the wireless gateway system, and the ID and the address of gateway device are recorded in a linked device table of the parent gateway device according to a connection relationship.

According to one further embodiment of the disclosure, the software server running in the gateway device performs the multi-gateway communication method. In the method, when the gateway device receives downlink data from one node, it is determined if the gateway device is connected to a destination node according to the destination node recorded in the downlink data and the linked device table. If the gateway device is not connected with the destination node but with a descendant gateway device, the downlink data is transmitted to the descendant gateway device if the destination node is listed in a downlink routing table of the descendant gateway device. Otherwise, if the destination node is not listed in the downlink routing table of the descendant gateway device, the downlink data is discarded.

Further, if the gateway device is connected with the destination node, the downlink data is transmitted to the destination node.

These and other aspects of the present disclosure will become apparent from the following description of the embodiment taken in conjunction with the following drawings and their captions, although variations and modifications therein may be affected without departing from the spirit and scope of the novel concepts of the disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
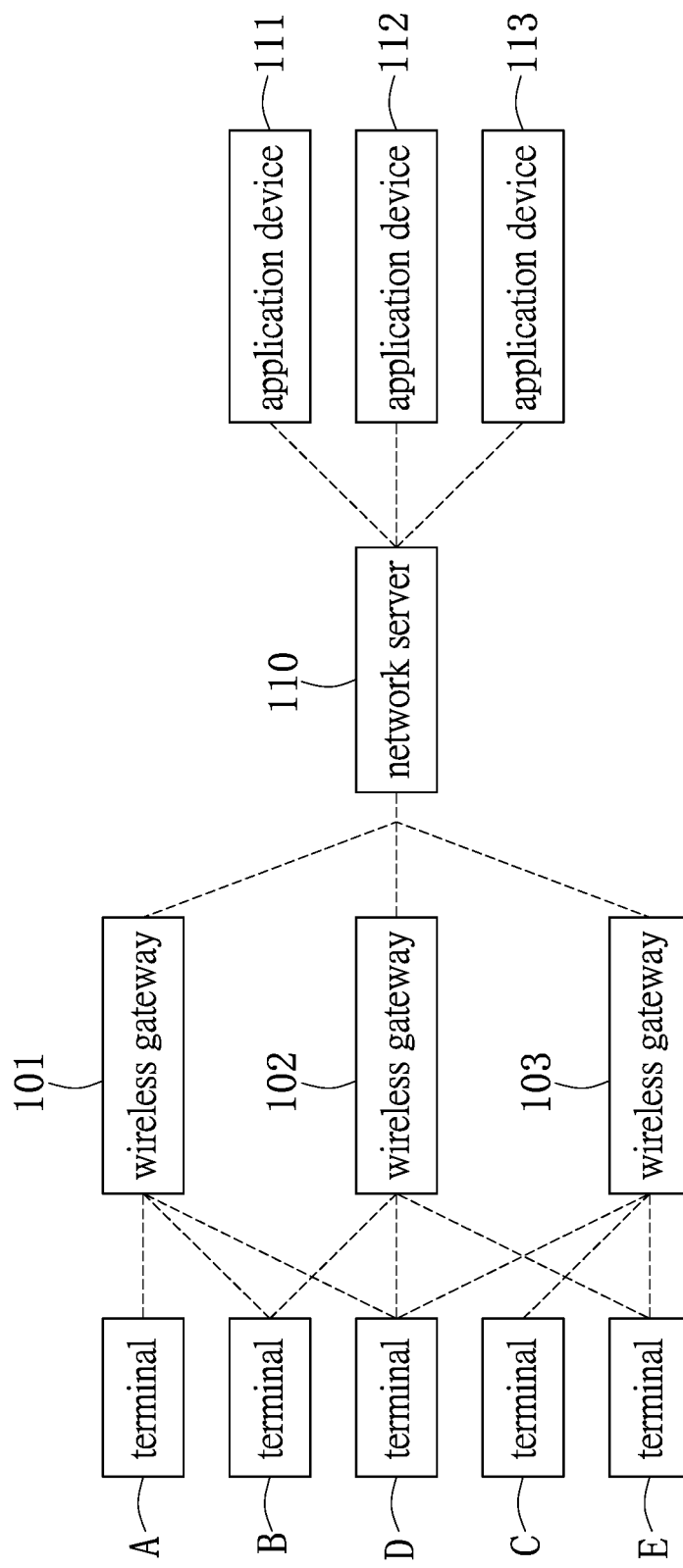
FIG. 1 shows a schematic diagram of a framework depicting a conventional network system used to process terminal data.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
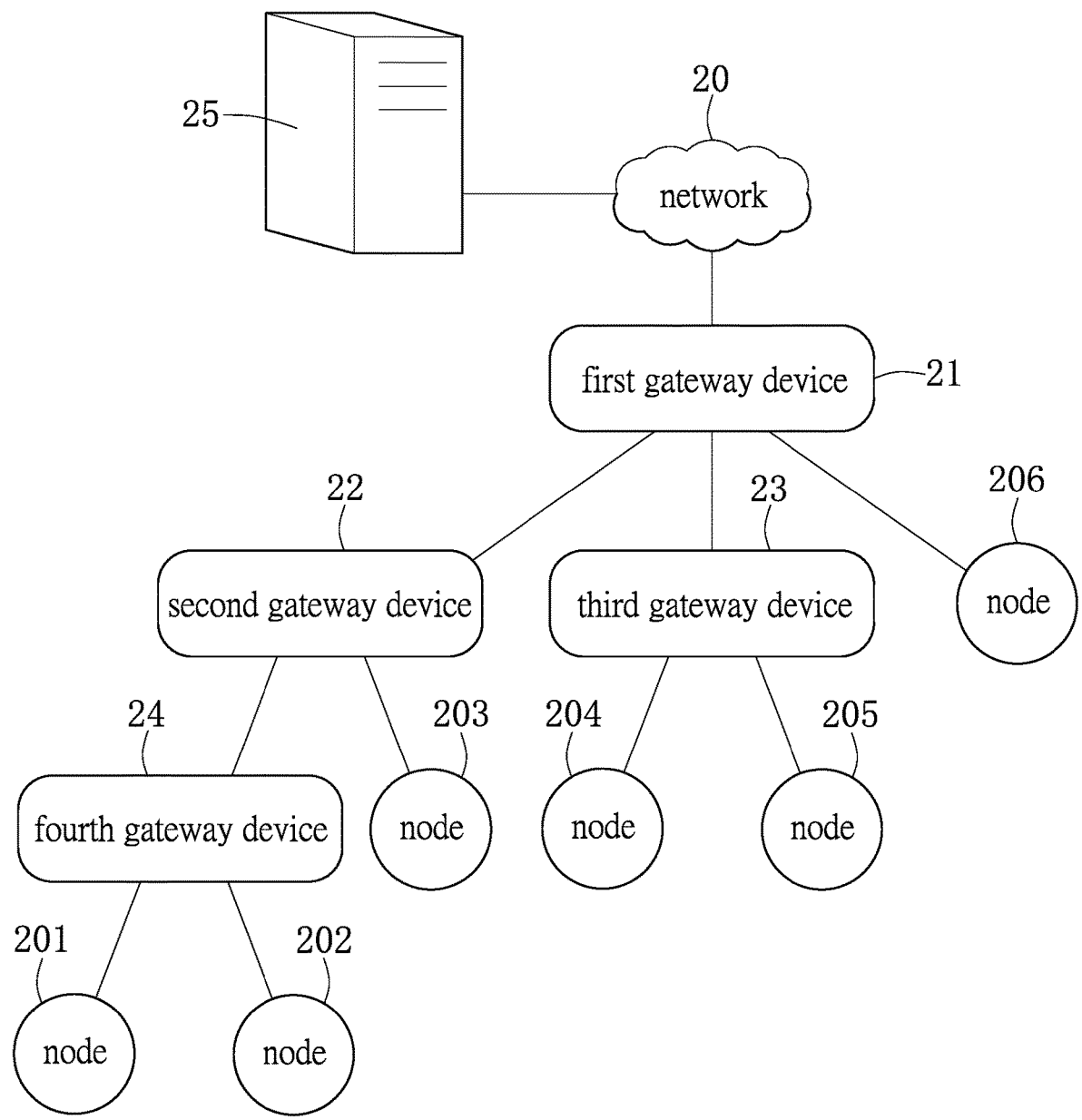
FIG. 2 shows a schematic diagram of a framework of a wireless gateway system according to one embodiment of the disclosure.

The disclosure is generally related to a multi-gateway communication method and a wireless gateway system, and preferably provides a solution of a communication system adapted to an IoT system. The method is applicable to the communication system including a plurality of nodes. In addition to the terminals, a gateway device is provided to allow the nodes to be communicated with each other. When the wireless gateway system is implemented at a user end, a local area network is formed. Reference is made to FIG. 2 which shows a schematic diagram of a framework of the wireless gateway system in one embodiment of the disclosure.

The wireless gateway system essentially includes a backend server 25. The backend server 25, relative to a local area network including multiple nodes, is a computer system disposed in an external network and used for receiving data stored in the nodes via the gateway device.

The wireless gateway system includes a plurality of nodes that exemplarily include normal nodes 201, 202, 203, 204, 205 and 206 disposed at the terminals and gateway devices 21, 22, 23 and 24. The nodes 201, 202, 203, 204, 205 and 206 are such as IoT terminal devices. The gateway devices 21, 22, 23 and 24 connect the nodes 201, 202, 203, 204, 205 and 206. Every node has network communication capability and can receive and transmit data. The gateway devices include a first gateway device 21, a second gateway device 22, a third gateway device 23 and a fourth gateway device 24 as exemplarily shown in the diagram. By the first gateway device 21, which acts as a root gateway in this topology, the gateway devices connect with the backend server 25 via the external network 20 or the Internet.

Further, each of the gateway devices runs a software server that is essentially used to perform a multi-gateway communication method. In the method, the software server processes the uplink data transmitted from the nodes and downlink data.

According to one of the embodiments of the disclosure, the root gateway, i.e. the first gateway device 21, of the wireless gateway system connects with the nodes via a wireless or wired connection. The wireless gateway system exemplarily embodies an IoT environment. The nodes are such as the IoT terminal devices. The nodes are communicated with each other via a wireless communication technology such as WiFi™, Bluetooth™, or LPWAN, which is an acronym for low-power wide area network. In the wireless gateway system, the node transmits the data via the root gateway over an uplink path. The backend server 25 collects the data transmitted from the nodes via the external network 20. The information relating to the nodes and the uplink data are stored in the backend server 25. The wireless gateway system includes this root gateway and the other nodes (21, 22, 23, 24, 201, 202, 203, 204, 205 and 206) that form a tree topology or a network topology with Directed Acyclic Graph (DAG) that can effectively avoid the problem of an infinite loop of broadcast packets occurring in the network.

It is worth mentioning that the root gateway allows the LAN to connect with the external network, and the LAN also includes some other gateway devices that are used for other specific uses according to actual needs. The gateway device can be used to create a small-scale subnet. For example, the node 203 connects upward to the second gateway device 22; a subnet including the fourth gateway device 24 and the nodes 201 and 202 connects upward to the second gateway device 22; the nodes 204 and 205 and the third gateway device 23 form another subnet; and the node 206 directly connects to the first gateway device 21 that acts as the root gateway for the whole network system. The nodes within the LAN finally connect with the external network via this root gateway, e.g. the first gateway device 21. According to one of the embodiments, the nodes including the gateway device(s) and the root gateway within the LAN adopt a communication protocol, i.e. an LoRaWAN, for defining the protocol within the LAN and a system framework thereof.

According to one of the embodiments of the disclosure, the software server operated in each of the gateway device or the root gateway implements a LoRaWAN network server (LoRaWAN NS) that is formulated by a LoRa Alliance as the communication protocol and system framework of a Long-Range communication network. The LoRaWAN NS implements a Long-Range communication link through a LoRa Physical Layer that is a network application with low power consumption, long distance, good service quality and security.

In the wireless gateway system, the root gateway is preferably an uppermost parent gateway device. The gateway devices 22, 23 and 24 that connect with the normal nodes 201, 202, 203, 204, 205 and 206 are provided in the LAN. The information of each of the nodes is broadcasted among the gateway devices 22, 23 and 24. The data generated by the terminal nodes are transmitted to the parent gateway via the descendant gateway device, and finally sent out via the root gateway. Further, the descendant gateway device can send a request to the parent gateway device, or even to the backend server 25 via the root gateway. The descendant gateway may request for the device information of its connected node and store the device information to a memory of the descendant gateway device.

Figure 3:
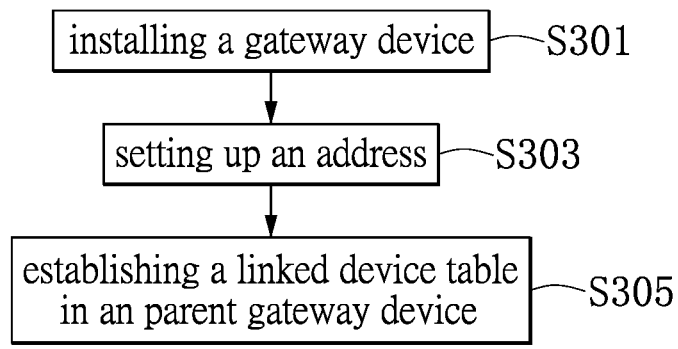
FIG. 3 shows a flow chart describing a process of installing a gateway device in the wireless gateway system in one embodiment of the disclosure.

FIG. 3 shows a flow chart describing a process of a wireless gateway system installing a gateway device according to one embodiment of the disclosure.

A gateway device is installed in the wireless gateway system (step S301). A system administrator can manually set up an ID and an address to every gateway device. Alternatively, the system may automatically allocate an address to every gateway device of the system (step S303). A linked device table will be created in a parent gateway device (step S305), and this linked device table acts as a basis for recognizing the descendant gateway device.

Table one exemplarily shows a linked device table created in one of the gateway devices. The linked device table primarily records ID(s) and address(es) of one or more nodes that may include a gateway device and device information such as session key that is used to establish a secure connection. The linked device table may record the address and the device information of a parent gateway device if the node is a gateway device with respect to other nodes. It should be noted that the parent gateway device may still be a root gateway and the session key is used as an encryption key for the parent gateway to establish connection(s) with other nodes.

TABLE ONE

| node address | Gateway device? | Device information |
| --- | --- | --- |
| FE103156 | Yes | Session key |
| FE061245 | No | Session key |
| FE045418 | No | Session key |

Further, every gateway device, including the root gateway, has a downlink routing table that records the device information of the gateway device that links the nodes within a LAN or a subnet. The device information may be the address of the node and used to look up the nodes along a downlink path. For example, for the downlink path, the gateway device recorded in a downlink routing table is a descendant gateway device. Therefore, the downlink routing table allows the system to conduct the task of downlink transmission. Table two exemplarily shows every node being connected with only one descendant gateway device.

TABLE TWO

| Node address | descendant gateway device address |
| --- | --- |
| FE053156 | FE104817 |
| FE061245 | FE101456 |
| FE045418 | FE105621 |

Figure 4:
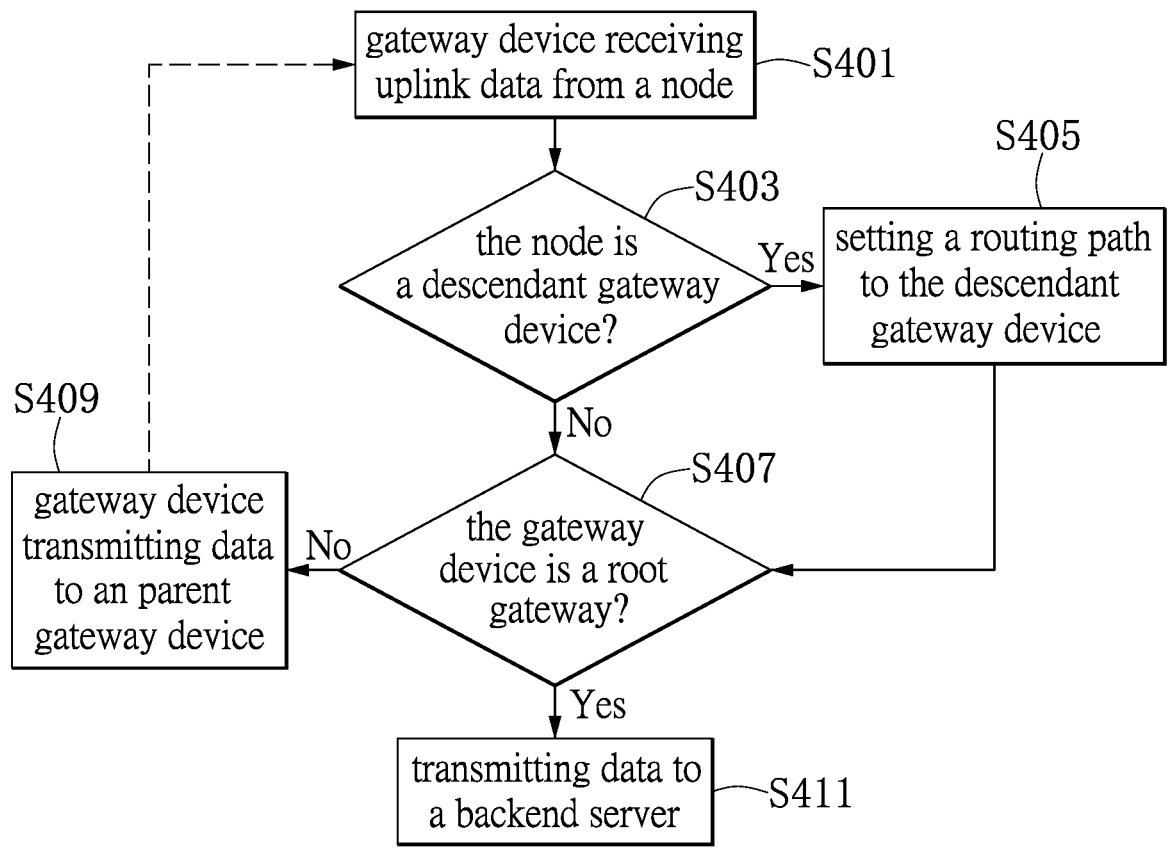
FIG. 4 shows a flow chart describing a process of processing uplink data in the multi-gateway communication method according to one embodiment of the disclosure.

Using the above-mentioned linked device table and the downlink routing table in the gateway device, a process of processing uplink data in the multi-gateway communication method is provided, as described in a flow chart shown in FIG. 4.

In the beginning, such as in step S401, one of the gateway devices of the wireless gateway system receives an uplink data from one of the nodes. In step S403, a software server running in the gateway device determines whether or not the node generating the uplink data is a descendant gateway device.

If the node is determined as the descendant gateway device, a routing path of the gateway device receiving the uplink data is set to the descendant gateway device, such as step S405. It should be noted that the data may be transmitted from a node that is connected with this descendant gateway device or other descendant gateway device if the data received by the gateway device acknowledges that the data is from the descendant gateway device. After that, the routing path of the downlink routing table in the gateway device is updated.

Otherwise, if the node generating the uplink data is not a descendant gateway device, or is the descendant gateway device and has completed the setting of routing path, the process performed in the gateway device goes on to determine whether or not the gateway device is a root gateway. (step S407).

If the gateway device is not the root gateway, it indicates that the gateway device is a normal gateway device, and in step S409, the uplink data is transmitted to its parent gateway device. In the meantime, the parent gateway device may be the root gateway of the wireless gateway system. The process then goes back to step S401 for processing the next data.

If the gateway device is the root gateway, in step S411, it indicates that this gateway device is at the uppermost level of the whole network system, and the data is transmitted to a backend server via a network.

Figure 5:
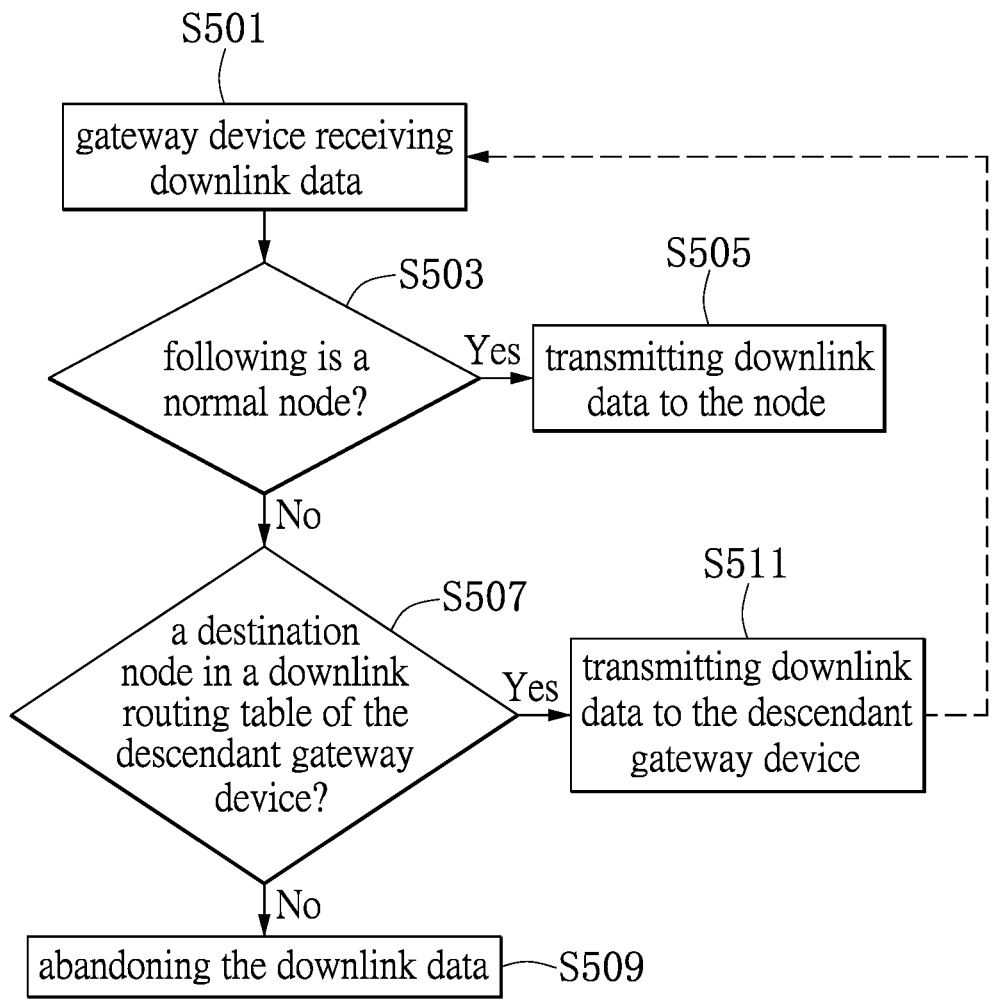
FIG. 5 shows another flow chart describing another process of processing the uplink data in the multi-gateway communication method in one further embodiment of the disclosure.

Reference is made to FIG. 5 which shows a flow chart describing a process of processing downlink data in the multi-gateway communication method according to one embodiment of the disclosure. In step S501, one of the gateway devices in the wireless gateway system receives a downlink data from a node at a higher layer. In step S503, a software sequence running in the gateway device determines whether or not any connected node in the downlink path is the destination node recorded in a packet header of the downlink data according to the linked device table or a downlink routing table of the gateway device.

When determining that the node connected with the gateway device is the destination node, in step S505, the downlink data is transmitted to the node along the downlink path of the gateway device. Otherwise, if no node connected with the gateway device is the destination node, it can be derived that the gateway device is connected with another descendant gateway device. The process goes on to determine whether or not the destination node is listed in the downlink routing table of the descendant gateway device (step S507).

If the downlink routing table of the descendant gateway device includes the destination node recorded in the packet header of the downlink data, the downlink data is transmitted to the descendant gateway device (step S511), and the process goes back to step S501 that allows the descendant gateway device to process the above steps. On the contrary, if the downlink routing table of the descendant gateway device does not have the record of the destination node, in step S509, the downlink data is discarded.

Figure 6:
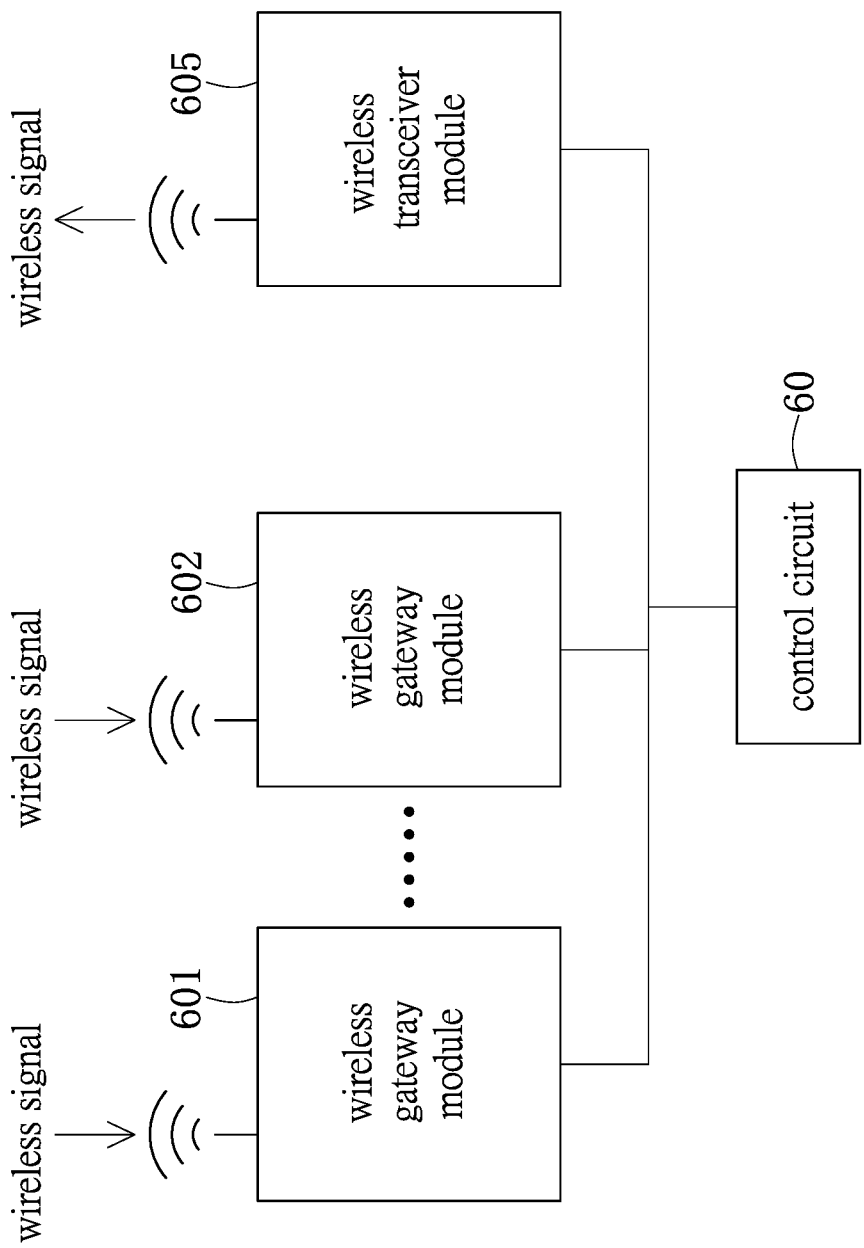
FIG. 6 shows a schematic diagram of a framework of a wireless gateway system according to one embodiment of the disclosure.

FIG. 4 and FIG. 5 respectively describe the processes of processing uplink data and downlink data in the multi-gateway communication method. Reference is made to FIG. 6 showing a schematic diagram of a communication system embodying the wireless gateway system according to one embodiment of the disclosure.

According to the wireless gateway system shown in the diagram, the circuits for receiving and transmitting data are divided into two independent modules and the system supports multi-channel two-way communication and provides better scalability. The main elements of the communication system include one or more wireless gateway modules, at least one wireless transceiver module and a control circuit. The control circuit mainly includes a processor, a memory and a communication circuit. The wireless gateway module can connect with the various nodes by a multi-channel communication technology. The nodes are such as the various IoT devices. In the communication method, the wireless gateway module receives signals from the terminal nodes, and the wireless transceiver module decides a transmission channel for sending the signals out after the control circuit processes the signals.

The main circuit modules included in the wireless gateway system are one or more wireless gateway modules 601, 602, at least one wireless transceiver module 605 and a control circuit 60. The two wireless gateway modules 601, 602 and the wireless transceiver module 605 shown in the schematic diagram of the communication system can be implemented by independent circuitries, and can also be software modules operated in some specific nodes. When implementing the system, one wireless transceiver module 605 is capable of processing the signals that multiple wireless gateway modules 601 and 602 can transmit to the nodes.

It should be noted that the numbers mentioned in the above implementation is not limited in the present disclosure. For example, multiple wireless transceiver modules 605 can also be adopted according to practical needs. The main circuits in the wireless gateway module are a gateway controller and a wireless gateway transceiver. The wireless gateway modules 601 and 602 support multi-channel two-way communication that is used to connect with the various terminal nodes. However, in the present communication system, the one-way multi-channel communication in the wireless gateway module is used. Therefore, the circuits in the wireless gateway module may not be affected by both the receiving and transmitting processes needing to wait for processing time since they share the same processing circuit at the same time. The transmitting process will be performed by the wireless transceiver module 605.

The wireless gateway module is used to connect with various terminal nodes such as a sensor, an electronic device and a home appliance. The wireless gateway module exemplarily implements a LoRa concentrator. The communication protocol initiating the connection between the wireless gateway module and the terminal nodes can be, but not limited to, WiFi™, Bluetooth™ or LPWAN.

The wireless transceiver module 605 that connects with one or more wireless gateway modules 601 and 602 can perform the transmission through its internal circuits. The wireless transceiver module 605 receives a transmission instruction from the control circuit 60. The transmission instruction includes a transmission request and signals. The wireless transceiver module 605 decides a transmission channel for sending out the signals via a transceiver and an antenna.

According to one of the embodiments of the disclosure, the wireless transceiver module 605 can be a Listen Before Talk (LBT) module that supports LoRa communication. The LBT module in operation needs to wait for a transmission instruction transmitted by the control circuit 60. While receiving the transmission instruction and resolving the inside information relating to a time stamp and a channel, the LBT module transmits the signal such as responding ACK to the terminal node via the channel designated by the control circuit 60. The LBT mechanism is able to determine if any channel is available by a process of clear channel assessment (CCA). For example, the LBT module can adjust a transmission time within a specific time range of one millisecond to ten milliseconds. Thus, the wireless communication system with the LBT mechanism can sense a channel in advance and assess whether the channel is free or non-free for activating a transmission process.

Furthermore, for expanding coverage and applications of the wireless communication system, the system will be required to process a huge amount of signals from a lot of sensors, e.g. the IoT devices. Therefore, the system needs a sufficient number of wireless gateway modules to cover a larger signaling range. Therefore, the communication system with separated receiving and transmitting circuits has an advantage for the expansion because the system can expand its coverage by increasing the number of the wireless gateway modules. Still further, the number of the wireless transceiver modules can also be increased for processing more data from the multiple channels.

The control circuit 60 acts as a main control circuit of the wireless communication system. The control circuit 60 can be implemented by integrating the circuit modules, integrated circuits, software and hardware. The control circuit 60 connects with the one or more wireless gateway modules 601, 602 and the at least one wireless transceiver module 605 via a bus or other types of connections such as wired or wireless connection. The control circuit 60 determines a transmission time after receiving signals from one of the wireless gateway modules 601 and 602. The control circuit 60 then instructs the wireless transceiver module 605 to send the signals out.

Figure 7:
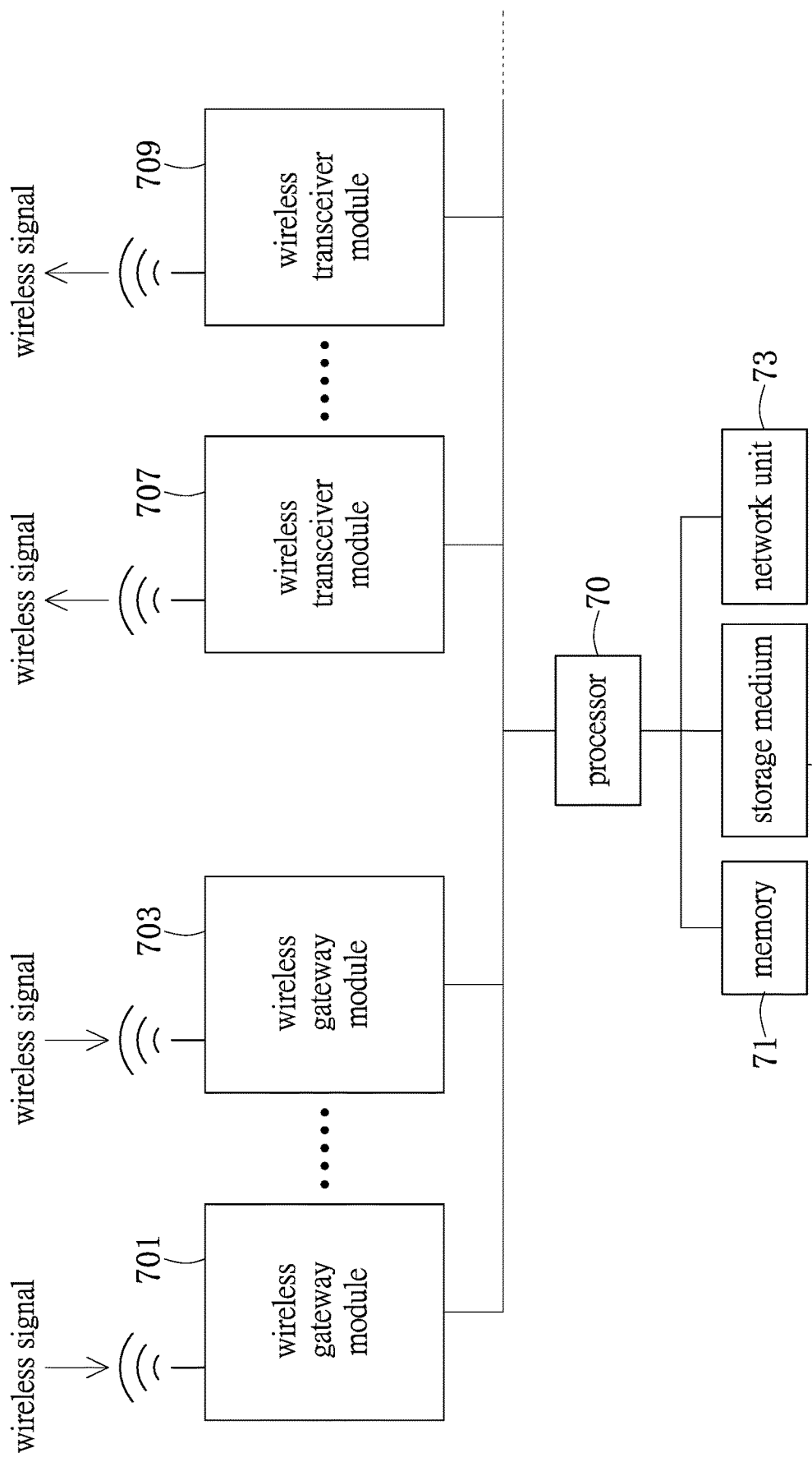
FIG. 7 shows a schematic diagram of the framework of the wireless gateway system according to one further embodiment of the disclosure.

FIG. 7 shows another schematic diagram depicting a system framework of the wireless gateway system according to one of embodiments of the disclosure.

Under this system framework, the wireless gateway system includes a plurality of wireless gateway modules 701 and 703 that are used to receive signals generated by the nodes. The signals generated by the nodes are such as the sensing data generated by sensors, the communication signals generated by the electronic device or the operating signals generated by the home appliance. In an exemplary example, the wireless gateway module can be a LoRa concentrator that connects with the terminal nodes via WiFi™, Bluetooth™ or LPWAN.

The system includes at least one wireless transceiver module. The present example shown in the diagram includes two wireless transceiver modules 707 and 709. Each of the wireless transceiver modules 707, 709 can process the signals received by the wireless gateway modules 701 and 703. When the system utilizes the one-way multiple channels to receive the signals, the process is not affected by the two-way communication. The flexible and scalable modular mechanism of the system allows the wireless gateway system to incorporate more wireless transceiver modules 707 and 709.

The control circuit of the present example includes a processor 70, a memory 71 and a storage media 72. A network unit 73 can also be used to connect with an external network. The processor 70 is used to manage operations of the modules of the system, and also to process the receiving and transmitting signals. The memory 71 acts as a system memory that is used to buffer signals. In addition to recording the operating information, the storage media 72 is used to store a signal scanning table that is established according to a signal scan result. The signal scanning table allows the system to adjust the channels in the communication method. The network unit 73 is performed to connect with the external network via a wired or wireless connection. For example, WiFi™ or Ethernet communication technology allows the system to link with a LAN or the Internet.

In one embodiment, the system depicted in FIG. 6 or FIG. 7 embodies a gateway device in a LAN for serving the IoT devices. A LoRa communication protocol implements the connections. The communication circuitry is divided into receiving and transmitting circuits under the LoRa communication protocol. According to the above embodiments of the disclosure, the wireless gateway module is responsible for receiving signals generated by the terminal nodes, and the wireless transceiver module is used to transmit the processed signals to an external device.

In summation, the wireless gateway system performing the multi-gateway communication method includes a plurality of gateway devices that implement an IoT network. Through the multi-gateway communication method, the uplink data and downlink data are processed in the system. A root gateway of the system is configured to connect with an external network. The wireless gateway system achieves an efficient, flexible and scalable network system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-gateway communication method, adapted to a wireless gateway system having a plurality of nodes forming a tree network topology that include a plurality of gateway devices with a root gateway that connects to an external network, wherein the method comprises:
   receiving, by one of the plurality of gateway devices, an uplink data from one of the plurality of nodes;
   transmitting, by the gateway device, the uplink data to a backend server via the root gateway since the node is not a descendant gateway device and the gateway device is the root gateway according to a linked device table;
   transmitting, the gateway device, the uplink data to a parent gateway device since the node is not a descendant gateway device and the gateway device is not the root gateway according to the linked device table;
   receiving, by one of the plurality of gateway devices, a downlink data from one of the plurality of nodes;
   determining whether or not the destination node is listed in a downlink routing table of the descendant gateway device according to a destination node recorded in the downlink data since the gateway device does not connect to the destination node but to the descendant gateway device; and
   transmitting the downlink data to the descendant gateway device since the destination node is listed in the downlink routing table; or discarding the downlink data since the destination node is not listed in the downlink routing table;
   wherein, the linked device table records the ID and the address of one or more nodes connected with the each of the gateway devices; the downlink routing tablet records device information of the gateway device that links the nodes within the wireless gateway system.

2. The method as recited in claim 1, wherein each of the gateway devices has an ID and an address when joining the wireless gateway system, and the ID and the address of the gateway devices are recorded in the linked device table of the parent gateway device according to a connection relationship.

3. The method as recited in claim 1, wherein, if the node is the descendant gateway device, a routing path is set to the descendant gateway device; after the routing path is set to the descendant gateway device, the method goes on to determine whether or not the gateway device is the root gateway.

4. The method as recited in claim 3, wherein each of the gateway devices has an ID and an address when joining the wireless gateway system, and the ID and the address of gateway device are recorded in the linked device table of the parent gateway device according to a connection relationship.

5. The method as recited in claim 1, wherein, if the gateway device connects to the destination node, the downlink data is transmitted to the destination node.

6. The method as recited in claim 5, wherein each of the gateway devices has an ID and an address when joining the wireless gateway system, and the ID and the address of gateway device are recorded in the linked device table of the parent gateway device according to a connection relationship.

7. The method as recited in claim 6, wherein the gateway device determines whether or not it is connected with the destination node or the descendant gateway device according to the linked device table.

8. A wireless gateway system, comprising:
a backend server;
a plurality of nodes forming a tree network topology including a plurality of gateway devices, in which a root gateway is set among the plurality of gateway devices for connecting with the backend server via an external network;
wherein, according to a linked device table, it is determined whether the gateway device is connected with a destination node or a descendant gateway device, each of the plurality of gateway devices operates a software server for performing a multi-gateway communication method including:
when one of the plurality of gateway devices receiving an uplink data from one of the plurality of nodes;
the gateway device transmitting the uplink data to a backend server via the root gateway since the node is not a descendant gateway device and the gateway device is the root gateway according to the linked device table;
the gateway device transmitting the uplink data to a parent gateway device since the node is not a descendant gateway device and the gateway device is not the root gateway according to the linked device table;
when one of the plurality of gateway devices receives a downlink data from one of the plurality of nodes, the destination node is recorded in the downlink data;
determining if the destination node is listed in a downlink routing table since the gateway device is not connected with the destination node but with a descendant gateway device; and
the downlink data is transmitted to the descendent gateway device since the destination node is listed in the downlink routing table; or the downlink data is discarded since the destination node is not listed in the downlink routing table;
wherein, the linked device table records the ID and the address of one or more nodes connected with the each of the gateway devices; the downlink routing tablet records device information of the gateway device that links the nodes within the wireless gateway system.

9. The system as recited in claim 8, wherein, if the node is the descendant gateway device, a routing path is set to the descendant gateway device; after the routing path is set to the descendant gateway device, the method goes on to determine whether or not the gateway device is the root gateway.

10. The system as recited in claim 9, wherein each of the gateway devices has an ID and an address when joining the wireless gateway system, and the ID and the address of gateway device are recorded in a linked device table of the parent gateway device according to a connection relationship.

11. The system as recited in 8, wherein, if the gateway device is connected with the destination node, the downlink data is transmitted to the destination node.

12. The system as recited in claim 11, wherein each of the gateway devices has an ID and an address when joining the wireless gateway system, and the ID and the address of gateway device are recorded in the linked device table of the parent gateway device according to a connection relationship.

* * * * *